(12) United States Patent
Philibert

(10) Patent No.: US 11,856,959 B2
(45) Date of Patent: Jan. 2, 2024

(54) SOURDOUGH AND PROCESS FOR PRODUCING SAME

(71) Applicant: Pascal Philibert, Replonges (FR)

(72) Inventor: Pascal Philibert, Replonges (FR)

( * ) Notice: Subject to any disclaimer, the term of this patent is extended or adjusted under 35 U.S.C. 154(b) by 610 days.

(21) Appl. No.: 16/963,721

(22) PCT Filed: Jan. 31, 2019

(86) PCT No.: PCT/EP2019/052418
§ 371 (c)(1),
(2) Date: Jul. 21, 2020

(87) PCT Pub. No.: WO2019/149839
PCT Pub. Date: Aug. 8, 2019

(65) Prior Publication Data
US 2021/0076689 A1    Mar. 18, 2021

(30) Foreign Application Priority Data
Jan. 31, 2018  (FR) ...................................... 1870101

(51) Int. Cl.
*A21D 8/04*    (2006.01)
*A21C 1/06*    (2006.01)
*A21D 8/06*    (2006.01)
*A21D 13/04*   (2017.01)

(52) U.S. Cl.
CPC .............. *A21D 8/045* (2013.01); *A21C 1/065* (2013.01); *A21D 8/047* (2013.01); *A21D 8/06* (2013.01); *A21D 13/04* (2013.01)

(58) Field of Classification Search
None
See application file for complete search history.

(56) References Cited

FOREIGN PATENT DOCUMENTS

| | | |
|---|---|---|
| FR | 2687544 A1 | 8/1993 |
| WO | 1999066801 A1 | 12/1999 |

OTHER PUBLICATIONS

House, "How to Make Quick and Easy Sourdough Starters with Grapes". Available online as of Sep. 27, 2016. pp. 1-7. http://www.cooking-outdoors.com. (Year: 2016).*
Lersch, "Sourdough work in progress, part II". Available online as of Oct. 18, 2009. pp. 1-17. https://khymos.org. (Year: 2009).*
"Convert grams Lactic acid to moles". Available online as of Feb. 27, 2023. pp. 1-8. ConvertUnits.com. (Year: 2023).*
"Convert grams acetic acid to moles". Available online as of Feb. 27, 2023. pp. 1-5. ConvertUnits.com. (Year: 2023).*
Calvel, et al. "The Taste of Bread", Gaithersburg, MD, Aspen Publishers, 2001. pp. 1-3. (Year: 2001).*
Spicher et al., "Untersuchungen zur Charakterisierung und Bewertung verschiedener Verfahren zur Bereitung eines Spontansauers. II. Einfluss der Fuehrungsbedingungen auf den Verlauf der spontanen Gaerung", Getreide Mehl Und Brot, Bochum, DE, vol. 41, No. 12, Jan. 1, 1987, pp. 372-376, XP009508171, ISSN 0367-4177.
International Search Report issued on International Application PCT/EP2019/052418, dated Mar. 29, 2019, 7 pages, together with English translation.
Foschino et al., "Microbial Characterization Of Sourdoughs For Sweet Baked Products", Italian Journal Of Food Science, Pinerolo, IT, vol. 11, No. 1, Jan. 1, 1999, pp. 19-28, XP008048868, ISSN 1120-1770.
Nionelli et al., "Exploitation of Albanian wheat cultivars: Characterization of the flours and lactic acid bacteria microbiota, and selection of starters for sourdough fermentation", Food Microbiology, Academic Press Ltd., London, GB, vol. 44, Jun. 2, 2014, pp. 96-107, XP029007831, ISSN 0740-0020.
Palomba, Simon, et al., "Microbial Characterization of Sourdough for Sweet Baked Prodcuts in the Campania Region (Southern Italy) by a Polyphasic Approach", Ann Microbiol vol. 61, Published online Oct. 22, 2010, pp. 307-314.

\* cited by examiner

*Primary Examiner* — Jenna A Watts
(74) *Attorney, Agent, or Firm* — Leber IP Law; Shelly M. Fujikawa

(57) ABSTRACT

Sourdough with a pH of between 3 and 6, an acetic acid content of less than 2,000 ppm, a lactic acid content of less than 8,000 ppm, a yeast content in log(CFU)/g of between 7 and 9, a lactic acid bacteria content in log(CFU)/g of between 8 and 10 and a growth measurement in cm in excess of 2 after five hours, which, when used in bakery, gives a cooked bread with a specific volume which is at least equal to 3 cm$^3$/g.

12 Claims, No Drawings

SOURDOUGH AND PROCESS FOR PRODUCING SAME

CROSS-REFERENCE TO RELATED APPLICATIONS

This application is a National Stage Entry of International Patent Application No. PCT/EP2019/052418, filed Jan. 31, 2019, which claims priority from French Patent Application No. 1870101, filed Jan. 31, 2018, the entire disclosures of which are incorporated herein by reference.

This invention relates to sourdough and processes for producing same.

Sourdough is a traditional product obtained by a natural acidifying fermentation process involving flour and water. The sourdough thus obtained contains a living, metabolically active microflora mainly composed of lactic acid bacteria and yeasts. Used in breadmaking, its purpose is to ensure that the dough rises and to acidify the dough. In France, sourdough is defined in Article 4 of Decree No. 93-1074 of 13 Sep. 1993, along with the characteristics expected of sourdough bread.

Sourdough is known for the typical aroma and odour of the resulting bread, which is characterised by its distinctive sour taste. This sourdough acidification functionality also affects the full range of organoleptic attributes (the crumb has a more fatty texture, irregular holes, a thicker and crisper crust), the bread keeps for longer and it encourages the bioavailability of minerals (phytate decomposes in an acidic environment).

Sourdough is clearly different from baker's yeast, which is obtained by selecting and multiplying strains of yeast, mainly of the *Saccharomyces* species, which has the ability to cause all types of dough to rise as its essential function. Each yeast is specifically selected for particular applications (standard dough, sweetened dough, acidic dough, chilled dough, frozen dough, etc.). Baker's yeast cannot be used to make sourdough bread because it does not produce the necessary organic acids. Sourdough, on the other hand, offers a lower dough raising action than yeast, but its lactic microflora produce a plurality of acids, particularly acetic acid in the sourdough bread. Making bread with sourdough therefore requires longer dough proving times than bread made with baker's yeast and causes the dough to be acidified as an essential part of the process. The use of sourdough is not therefore generally suited to making standard bread or sweetened dough such as brioche dough, which has a short proving time and where the end products do not need to be acidic.

A direct breadmaking process is a process in which fermentation of the dough is never stopped by chilling between the start of kneading and the end of the baking process. Delayed breadmaking processes, on the other hand, have a chilling phase to stop fermentation, which makes it easier for the baker to organise his workload in modules. A short breadmaking process includes dough fermentation times of less than six hours, whereas a long process requires dough fermentation times in excess of six hours.

The object of the invention is a sourdough and a process for producing same, this being capable of causing all types of dough to rise, without the addition of yeast, and, in addition, a development to ferment the dough for sourdough bread. Sourdoughs obtained according to the invention comply with the French regulations and are distinguished by their wide range of uses without the addition of baker's yeast. They are equally suitable for use in direct or delayed, short or long breadmaking processes, those that encourage the dough to rise without making the final product acidic, or to make sourdough bread in accordance with the French regulations with a pH<4.3 and an acetate content >900 ppm (for improved sourdough according to the invention).

Commercial sourdoughs that are currently available on the market do not have such a flexible range of use. The proposed sourdoughs do not offer adequate performance to allow normal or sweetened dough to rise in short breadmaking processes.

Furthermore, for the purpose of sourdough bread applications in accordance with the French regulations, current commercial sourdoughs contain high levels of organic acids, which causes the metabolic activity of the microorganisms they contain to slow down considerably. These sourdoughs therefore provide the necessary acids in quantity, but have a reduced fermentation activity during breadmaking both in terms of acidification and in the way the dough rises, and therefore generally require baker's yeast to be added. The improved sourdough according to the invention is notable because it has a relatively low acidity but has a metabolically active microflora which produces endogenous organic acids during breadmaking, causing the dough to rise without the addition of yeast.

In terms of the production process, the present invention describes an entirely natural process based on spontaneous fermentation of the microorganisms present on fermentable substrates and controlled by physical parameters, unlike the manufacturing process for baker's yeast, which requires the addition of nutrients and chemical products such as ammonium phosphate and anti-foaming agents, or unlike other processes for producing sourdough seeded with selected microbial starters and cultivated on synthetic nutrient media.

The invention relates to a sourdough that can be used without the addition of yeast to make all types of bread, brioche, panettone and other forms of leavened dough and flaky leavened dough requiring a fermentation phase. According to a development of the invention, it also makes it possible to produce sourdough bread with a reduced quantity of sourdough than with previous sourdoughs.

In the production process for a sourdough according to the invention, the following steps take place consecutively:

a) a fermentable matrix is washed in water by completely submerging it in water and allowing the water to flow until it runs clear so as to obtain a washed matrix, or still containing 200 g to 1.5 kg of residual water per 2 kg of matrix to be incubated, or containing less than this and, in the latter case, the washed matrix is submerged in water at between 10 and 35° C. at the rate of 1 kg to 20 kg water per 2 kg of matrix to be incubated, incubation taking place at between 10 and 35° C. until bubbles appear on the surface of the liquid (known as the liquor) so as to obtain an incubated matrix, b) the liquor is separated from the rest of the incubated matrix, c) the liquor is mixed with substrate to obtain a mixture with a dry matter content by weight ranging between 15 and 60% and this is allowed to ferment for 12 to 72 hours at between 9 and 30° C. to obtain a medium and d) substrate and water at between 10° C. and 35° C. are added to the medium, the addition of substrate and water representing 25 to 75% of the total volume to obtain the product, and fermentation is allowed at between 9° C. and 30° C. while blowing with air, oxygen or a mixture of gases containing oxygen. Food-quality air can be injected by any system allowing air to be diffused at the bottom of the bowl with a flow rate varying from 0.01 of product to 10 m3/h/kg of product, preferably at a flow rate between 0.01 and 1 m3/h/kg of product to obtain the sourdough.

It is crucial only to blow in air or oxygen in step d).

Step c) and step d) are preferably repeated a plurality of times, specifically three times.

Step d) may preferably be followed by a step e) in which step d) is repeated, but with a dry matter content ranging from 30 to 60% by weight. Step e) is preferably repeated at least three times.

The fermentable matrix is a material that naturally contains microbial flora, specifically lactic acid bacteria and yeasts. This matrix may specifically include:
  grains (soft wheat, hard wheat, rye, for example), pseudo-cereals (buckwheat, quinoa, for example), pulses; and in all their forms (whole dry or sprouted seeds, flours, cornmeal and other fractions (bran, germ, for example)),
  all fruit (apples, pears, banana, grapes, for example) and dried fruit, either whole or in part (skin, flesh, pulp, pips), both fresh and processed (dried, juice, fermented must),
  wood from grapevines (stalks, chips, etc.),
  brassicas, hops, malts (wheat, barley, for example), honey, etc.

The substrate may be flour or any other grain or pseudo-cereal or pulse fraction.

The process makes it possible to obtain a sourdough with a pH of between 3 and 6, a total titratable acidity of less than 20, an acetic acid content of less than 2,000 ppm, a lactic acid content of less than 8,000 ppm, a yeast content in log(CFU)/g of between 7 and 9, a lactic acid bacteria content in log(CFU)/g of between 8 and 10, and which, when used in a bakery in a breadmaking process based on the following consecutive steps: the following are placed in order in a spiral dough mixer with a rotating arm and bowl: 1,275 g water, 2,000 g flour and 200 g sourdough. They are kneaded for 5 minutes with the arm operating at a speed of 70 rpm and the bowl operating at 10 rpm. 40 g salt is added to the mixer. The mixture is then needed for three minutes with the arm operating at a speed of 160 rpm and the bowl operating at 18 rpm so as to obtain a dough temperature after the kneading process of 25 to 27° C. The dough undergoes a first fermentation for one hour in the fermentation chamber at 25° C. with a relative humidity of 75%. The dough is manually divided into pieces weighing 350 g, which are pre-formed into oval balls. These are allowed to rest for 20 minutes in the fermentation chamber at 25° C. and with a relative humidity of 75%. They are then shaped into a baguette or short baguette (bâtard) with the seam on top. A second fermentation process is carried out for 4 to 5 hours in the fermentation chamber at 25° C. with a relative humidity of 75%, and finally the bread is cooked for 20 minutes at 240° C. with steam injected when placed in the oven, gives a dough prior to baking with a growth measurement in cm in excess of 2 after 5 hours and in excess of 2.8 after 6 hours, and this dough gives a bread with a specific volume at least equal to 3 cm$^3$/g, and, preferably, an acetate rate in excess of 900 ppm and a pH of more than 4.3 in a sourdough bread manufacturing process.

5 to 40% sourdough, preferably 10 to 15%, compared to the weight of flour, is used to make ordinary bread.

0.5 to 5% sourdough, preferably 1 to 3%, compared to the weight of flour, is used to make sourdough bread.

The pH and total titratable acidity (TTA) are measured using samples of fresh sourdough. Ten grams of sourdough is mixed with 90 ml distilled water using a magnetic agitator for five minutes. The pH of this mixture is measured while agitating using a Mettler Toledo (brand name) pH meter, model G20. The TTA (total titratable acidity) is measured while agitating by titrating with 0.1 mol/l (mole per litre) sodium hydroxide until a pH of 8.5 is obtained. The TTA is defined as the volume (in ml) of the 0.1 mol/l NaOH solution required to reach a pH of 8.5.

The dry matter (DM) of the sourdoughs is measured using an infrared method with a Radwag (brand name) halogen desiccator, model MAC 50/1. The sourdough samples are fresh. Measurements are carried out in triplicate on 2.0±0.1 g sourdough and then averaged out. The analysis programme uses a temperature of 130° C. until the variation in the weight value is ≤1 mg over a 25-second period. Values are expressed as a percentage of the DM contained in the sourdough.

The lactic acid and acetic acid contents are measured using the enzymatic method by means of ENZYTEC™ D-/L-lactic acid kits and ENZYTEC™ acetic acid kits (Scil Diagnostic GmbH, Germany). These sourdough samples are fresh, homogenised and diluted by a factor of 100, then centrifuged at 12,000 g for 20 minutes. The supernatant is extracted. Analysis is conducted on this sample. The results are expressed in ppm (parts per million=mg/kg).

The yeast content was determined using reference standard AFNOR NF V08-059, a routine method, in the following manner:
  Seeding takes place on the surface of a glucose agar with chloramphenicol (Biokar (brand name)) which is first poured into Petri dishes with a specified quantity of initial suspension and/or decimal dilutions of the sample. Counting takes place after incubation of the dishes under aerobic conditions at 25+/−1° C. for 5 days. The result is expressed as a logarithm of colony-forming units per gram of sourdough (log(CFU)/g).

The mesophilic lactic acid bacteria content was determined using reference standard NF ISO 15214 (classification index V 08-030), reference method, in the following manner:
  Seeding takes place on the surface of an MRS agar (Biokar (brand name)) which is first poured into Petri dishes with a specified quantity of initial suspension and/or decimal dilutions of the sample. Counting takes place after incubation of the dishes under anaerobic conditions at 30° C. for 72 to 120 hours. The result is expressed as a logarithm of colony-forming units per gram of sourdough (log(CFU)/g).

Growth measurements after 5 hours and 6 hours were determined using a Bailer growth measurement device comprising a test specimen graduated from 1 to 7, measuring 0.2 by 0.2 mm, in accordance with standard NF X03-716. At the end of the kneading process, 20 g bread dough is sampled and placed in the Bailer measurement device in such a way that the surface is level. The growth volume is recorded every hour until 6 hours of growth.

The bread volume (in cm$^3$) is determined using a Chopin volume meter. The weight of the bread is measured using a Mettler Toledo® model VIPER SW 6 balance. The specific volume is the ratio between the volume and the weight of the bread and is expressed in cm3/g.

Once it has been produced, sourdough can be used as is or stored under positive or negative cold conditions, or dehydrated by any process that allows water to be removed while keeping the micro-organisms alive, such as, for example, freeze-drying, or any other technique in which it can be maintained as many times as necessary so as to keep the ecosystem in an active state and thus propagate fermentation and maintain the characteristics of the sourdough.

Sourdough can be used to produce all kinds of doughs requiring fermentation such as bread and all bread variations, farmhouse bread, grain bread, traditional bread, cornbread, baguettes, etc., sandwich bread, buns and derivatives thereof, pastries, brioche, croissants, panettone and variations thereof, pizza dough. These types of dough may specifically include:

leavened or kneaded dough:
    brioche dough,
    bread dough,
    savarin dough,
    rum baba dough,
    panettone
flaky leavened dough:
    croissant dough or turned dough,
    Danish pastry dough,
beaten dough:
    madeleine batter,
    genoese batter,
    Genoa cake batter,
    biscuit dough,
    cake batter,
others:
    doughnut batter,
    pancake batter,
    turned dough may form the basis for cakes.

The resulting sourdough bread (in accordance with the Bread Decree of 1993) has a typical taste resulting from the fermentation process with a thick, golden and crisp crust.

Normal bread (in other words bread not produced using the sourdough bread recipe) has a fine golden crust, is crisp and does not have a very pronounced taste. The sourdough according to the invention represents 5 to 40%, and preferably 10 to 15% of the weight of flour used to make normal bread. In the case of sourdough bread, the improved sourdough according to the invention represents 0.5 to 5%, and preferably 1 to 3% of the weight of flour (substrate) with a low ash content used to make sourdough bread.

Brioche also has a fine, golden and glossy crust, a light, melt-in-the-mouth crumb, buttery and creamy lactic aromas, without any acidic taste.

Panettone that complies with the Italian legislation for this product can also be made using sourdough and has the typical organoleptic and sensory characteristics of this product.

The process according to the invention may be carried out using the following steps:

Step 1: Wash the fermentable matrix with water (any type of water) at a temperature of between 10 and 30° C. Washing can be achieved: 1/by placing the fermentable matrix in a container and then submerging it in water (cover the matrix completely with the water), then draining by using a sieve, skimmer or strainer (turn the container upside down to drain the water, recovering the fermentable matrix at the same time) or 2/by placing the fermentable matrix in a perforated container (sieve, strainer, skimmer, etc.) or by holding it in your hand and then allowing water to flow over the matrix (any type of water, any flow rate) such that the water rinses the matrix and then drains off immediately.

The purpose of this step is to remove any impurities from the fermentable matrix. The washing operation must be repeated until the rinsing water is clear (translucent), in other words until the water flowing during the draining process (case 1) or post-rinsing (case 2) is identical to the clean water used to wash the matrix.

Step 2: Drain the washed matrix by placing it in a perforated container so that the water can drain naturally or by spinning it in any system that enables the water to be separated from the matrix.

Step 3: Submerge the drained fermentable matrix in water (any type of water) at a temperature of between 10 and 35° C. Add water so as to submerge the matrix by at least half of the height/volume it occupies in the container and, as a maximum, preferably up to 10 times the quantity of matrix used (e.g.: for 2 kg of matrix you may add up to 20 kg water).

It is possible not to add water during this step. After the draining process in step 2, the matrix is placed in a container and then proceed to step 4. The residual water absorbed by the grains is sufficient to start a fermentation process. The residual quantity of water must be between 200 g and 1.5 kg (if more than this, it is said to be submerged, as in the case above).

Step 4: Incubate this cleaned matrix at between 15 and 35° C. for 18 to 168 hours, preferably between 20 and 30° C. and more preferably at 25° C., preferably for 24 hours over 5 days and more preferably from 48 to 72 hours.

At the end of incubation, if the incubated matrix is submerged, check that there is a plurality of bubbles on the liquid surface. This means that fermentation of the fermentable substance is effective and that the liquid (known as the liquor) contains a microflora that at least consists of yeasts and lactic acid bacteria.

If the incubated matrix is not submerged, move directly to step 5.

Step 5: Recover the liquid phase only (known as the liquor) using any equipment that allows the liquid part to be separated from the solid part of a matrix. For example, to separate the liquid phase from the solid phase (and recover the two phases separately), it is possible to filter with a porosity in excess of 100 μm (in this case), then centrifuge, compress and settle the resulting substance.

It is possible to pass directly from step 5 to step 9. However, it is preferable to carry out the intermediate steps 6 to 8, because these allow a stable ecosystem to be established, this being composed of lactic acid bacteria and yeasts. If you move directly to step 9, it is advisable to apply moderate aeration so as not to discourage the lactic flora comprising anaerobic bacteria, which could potentially unbalance the ecosystem.

Step 6: Place the liquor in a container (any kind of container complying with food standards) of any type of shape, size and material.

Then mix this liquor with the substrate. The substrate may be flour or any other grain or pseudocereal or pulse fraction. The mixing process can be carried out with any manual or mechanical means or equipment to obtain a homogeneous mixture (homogeneous: the number of agglomerates/aggregates will not exceed 50% by weight of the mixture). The dry matter (DM) of the mixture thus produced must be between 15 and 60% by weight, preferably between 40 and 50% and more preferably between 42 and 46%.

Then leave to ferment for 12 to 72 hours, preferably between 18 and 48 hours and more preferably between 22 and 28 hours, at between 9 and 30° C., preferably between 15 and 27° C., and more preferably between 23 and 26° C., with or without agitation (any type of agitation system/equipment, permanent or intermittent agitation, at a low speed of between 30 and 150 revolutions per minute to prevent settling).

Step 7: Place the liquor in a container (any kind of container complying with food standards) of any type of shape, size and material.

Renew the medium by adding substrate and water (any type of water) at a temperature of between 10 and 35° C. so that this addition (substrate plus water) represents between 25 and 75%, preferably between 33 and 60%, and more preferably between 33 and 50% of the final volume. The mixing process can be carried out with any manual or mechanical means or equipment to obtain a homogeneous mixture (homogeneous: the number of agglomerates/aggregates must not exceed 50% by weight of the mixture). The dry matter (DM) of the final mixture must be between 15 and 60% by weight, preferably between 40 and 50% and more preferably between 42 and 46%.

Then leave to ferment for 12 to 168 hours, preferably between 18 and 72 hours and more preferably between 24 and 48 hours, at between 9 and 30° C., preferably between 15 and 27° C., and more preferably between 23 and 26° C., with or without agitation (any type of agitation system/equipment, permanent or intermittent agitation, at 30 to 150 revolutions per minute to prevent settling).

Step 8: Same as step 7.

Step 9: Place the medium obtained at the end of step 8 in a container (any kind of food-grade container) of any type of shape, size and material.

Renew the medium by adding substrate and water (any type of water) at a temperature of between 1 and 35° C., preferably between 1 and 15° C., so that this addition (substrate+water) represents between 25 and 75%, preferably between 33 and 66%, and more preferably 50% of the final volume. The mixing process can be carried out with any manual or mechanical means or equipment to obtain a homogeneous mixture (homogeneous: the number of agglomerates/aggregates must not exceed 50% by weight of the mixture). The dry matter (DM) of the final mixture must be between 15 and 60% by weight, preferably between 40 and 50% and more preferably between 42 and 46%.

Then agitate the mixture with any type of agitation system/equipment, where this agitation process may be permanent or intermittent, at any speed and with air or oxygen being injected by means of any type of equipment or technology for injecting air, oxygen or a mixture of gases containing oxygen. Air should preferably be injected from beneath. Air (preferably oil-free air) may be injected via a sparger at the bottom of the bowl at a pressure, for example 8.5 bar, and a flow rate varying from 0.01 m$^3$/h/kg of mixture to 10 m$^3$/h/kg of mixture depending on its consistency, preferably with a flow rate of between 0.01 and 1 m$^3$/h/kg of mixture.

Leave to ferment under these agitation and aeration conditions and at a temperature of between 9 and 30° C., preferably between 9 and 17° C., and more preferably between 10 and 15° C., for 12 hours to 10 days, preferably between 3 and 8 days, and more preferably between 6 and 8 days.

The injection of air or oxygen and the temperature and fermentation time are regulated such as to preferably obtain a minimum yeast content of $10^7$ CFU/g at the end of this step.

This procedure encourages the development of the yeast flora compared with lactic acid bacteria. With regard to the specified temperature range, the higher the temperature, the shorter the fermentation time (and vice versa).

The process can be halted at the end of this step (9), but it is preferable to carry out the subsequent steps.

Step 10: Place the medium obtained at the end of step 9 in a container (any kind of container complying with food standards) of any type of shape, size and material.

Renew the medium by adding substrate and water (any type of water) at a temperature of between 1 and 35° C., preferably between 1 and 15° C., so that this addition (substrate+water) represents between 25 and 75% of the final volume, preferably between 33 and 66%, and more preferably 50%. The mixing process can be carried out with any manual or mechanical means or equipment to obtain a homogeneous mixture (homogeneous: the number of agglomerates/aggregates must not exceed 50% by weight of the mixture). The dry matter (DM) of the final mixture must be between 15 and 60% by weight, preferably between 40 and 50% and more preferably between 42 and 46%.

Then agitate the mixture with any type of agitation system/equipment, where this agitation process may be permanent or intermittent, at any speed.

Leave to ferment under these agitation and aeration conditions and at a temperature of between 9 and 30° C., preferably between 9 and 17° C., and more preferably between 10 and 15° C., for 16 hours to 72 hours, preferably between 36 and 72 hours, and more preferably for 48 hours.

Step 11: Same as step 10.

The purpose of steps 9, 10 and 11 is to encourage the development of the yeast flora and, in general terms, to allow the microbial ecosystem and the physical and chemical properties of the sourdough to establish, obtaining the sourdough according to the invention, although not improved.

Step 12: To produce an improved sourdough, which is suitable for making normal bread and for making sourdough bread, the most preferred values will preferably be taken from the preceding steps and step 12 will also be added, repeating step 11, apart from the fact that the DM from the final mixture will be between 30 and 60%, preferably between 40 and 53%, specifically between 45 and 50%, and step 12 may be repeated at least three times. This repetition is favourable for producing the improved sourdough.

Finally, to produce the improved sourdough, the substrate (flour) should have an ash content >0.75%, preferably between 0.75 and 1% by weight (percentage relating to the dry matter in the flour). The ash content is measured by incineration in accordance with Standard NF EN ISO 2171 on 5 g+/−0.1 mg flour, weighed precisely. The result is expressed as a percentage of mass in relation to dry matter.

The improved sourdough according to the invention is obtained at the end of this step.

The following examples illustrate the invention.

EXAMPLE 1

6 kg of wheat grains were weighed in a bucket made from food-grade PP (where PP stands for polypropylene).

30 litres of tap water at 15° C. was added and then left to rest at ambient temperature for 30 minutes.

Washing the wheat grains: the grains, which were submerged in water, were then rubbed between the hands by friction for 10 minutes, after which the water was drained off. 30 litres of tap water at 15° C. is added again, and the grains are once again rubbed by friction between the hands (this operation is repeated five times in succession).

Rinsing the wheat grains: 30 litres of tap water at 25° C. is poured over the wheat grains and the grains are then drained by pressing manually through a conical stainless steel strainer. The water is then discarded and the grains are kept (this operation is repeated 15 times in succession).

Final drainage of the grains by pressing manually through a conical stainless steel strainer. Only the grains are kept.

The 6 kg of washed and drained wheat grains are placed in a bucket made from food-grade PP.

24 kg of tap water at 25° C. is added.

The bucket is placed in a drying oven at 25° C. for 67 hours.

The preparation is drained by pressing manually through a conical stainless steel strainer to separate the liquid phase (liquor) from the grains. Only the liquid phase is kept.

13 kg of liquor is weighed and placed in a stainless steel fermenter.

13 kg of wheat flour is added.

The mixture is homogenised with a rotor-stator agitator at 1,500 rpm for 10 minutes.

The preparation is kept at 25° C. for 24 hours.

The DM in the fermented preparation amounted to 47.5% and the temperature was 25° C.

24 kg of the preparation is kept.

6 kg of wheat flour and 6 kg of tap water at 25° C. are added.

The mixture is homogenised with a rotor-stator at 1,500 rpm for 10 minutes.

The preparation is kept at 25° C. for 24 hours.

The DM in the fermented preparation amounted to 42.5% and the temperature was 24.9° C.

30 kg of the preparation is kept.

2.94 kg of wheat flour and 12.06 kg of tap water at 25° C. are added.

The mixture is homogenised with a rotor-stator agitator at 1,500 rpm for 10 minutes.

The preparation is then kept at 25° C. for 48 hours.

The DM in the fermented preparation amounted to 34.4% and the temperature was 26.8° C.

40 kg of the preparation is kept.

16.3 kg of wheat flour and 23.7 kg of tap water, first cooled to 6° C., are added.

The mixture is homogenised with a rotor-stator agitator at 1,500 rpm for 15 minutes.

The preparation is then allowed to ferment for 96 hours at 15° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min (Nl/min: air held under Standard Reference Atmosphere conditions).

The DM in the fermented preparation amounted to 33.51%.

40 kg of the preparation is kept.

16.6 kg of wheat flour and 23.4 kg of tap water, first cooled to 6° C., are added.

The mixture is homogenised with a rotor-stator agitator at 1,500 rpm for 15 minutes.

The preparation is then allowed to ferment for 24 hours at 15° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min.

The DM in the fermented preparation amounted to 34.85% and the temperature was 16.2° C.

40 kg of the preparation is kept.

16.1 kg of wheat flour and 23.9 kg of tap water, first cooled to 6° C., are added.

The mixture is homogenised with a rotor-stator agitator at 1,500 rpm for 15 minutes.

The preparation is then allowed to ferment for 24 hours at 15° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min.

The DM in the fermented preparation amounted to 34.09% and the temperature was 17.3° C.

40 kg of the preparation is kept.

16.1 kg of wheat flour and 23.9 kg of tap water, first cooled to 6° C., are added.

The mixture is homogenised with a rotor-stator agitator at 1,500 rpm for 15 minutes.

The preparation is then allowed to ferment for 96 hours at 15° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min.

The DM in the fermented preparation amounted to 35.8% and the temperature was 17.3° C.

The preparation is cooled to 4° C. and kept at 4° C.

This sourdough will subsequently be used for bread, brioche and panettone applications, the results of which will be shown.

COMPARATIVE EXAMPLE 1

1 kg of wheat grains were weighed in a bucket made from food-grade PP.

5 litres of tap water at 15° C. was added and then left to rest at ambient temperature for 30 minutes.

Washing the wheat grains: the grains, which were submerged in water, were then rubbed between the hands by friction for 10 minutes, after which the water was drained off. 5 litres of tap water at 15° C. is added again, and the grains are once again rubbed by friction between the hands (this operation is repeated five times in succession).

Rinsing the wheat grains: 5 litres of tap water at 25° C. is poured over the wheat grains and the grains are then drained by pressing manually through a conical stainless steel strainer. The water is then discarded and the grains are kept (this operation is repeated 15 times in succession).

Final drainage of the grains by pressing manually through a conical stainless steel strainer. Only the grains are kept.

The kilogram of washed and drained wheat grains are placed in a bucket made from food-grade PP.

4 kg of tap water at 25° C. is added.

The bucket is placed in a drying oven at 25° C. for 67 hours.

The preparation is drained by pressing manually through a conical stainless steel strainer to separate the liquid phase (liquor) from the grains. Only the liquid phase is kept.

1,750 g of liquor is weighed in a bucket made from food-grade PP.

1,750 g of wheat flour is added.

The mixture is homogenised manually using a kitchen whisk for 5 minutes.

The preparation is then placed in a drying oven at 25° C. for 24 hours.

The DM in the fermented preparation amounted to 47.5% and the temperature was 25° C.

3,300 g of preparation is weighed in a bucket made from food-grade PP.

825 g of wheat flour and 825 g of tap water at 25° C. are added.

The mixture is homogenised manually using a kitchen whisk for 5 minutes.

The preparation is then placed in a drying oven at 25° C. for 24 hours.

The DM in the fermented preparation amounted to 42.5% and the temperature was 24.9° C.

4,800 g of preparation is weighed in a bucket made from food-grade PP.

470 g of wheat flour and 1,930 g of tap water at 25° C. are added.

The mixture is homogenised manually using a kitchen whisk for 5 minutes.

The preparation is then placed in a drying oven at 25° C. for 48 hours.

The DM in the fermented preparation amounted to 34.4% and the temperature was 26.8° C.

500 g of preparation is weighed in a bucket made from food-grade PP.

650 g of wheat (no added water).

The mixture is homogenised using a Kitchenaid 5KSM45 stand mixer with a paddle attachment at speed 1 for 2 minutes.

The preparation is then placed in a drying oven at 15° C. for 96 hours.

The DM in the fermented preparation amounted to 65.44%.

500 g of preparation is weighed in a bucket made from food-grade PP.

425 g of wheat flour and 75 g of tap water, first cooled to 6° C., are added.

The mixture is homogenised using a Kitchenaid 5KSM45 stand mixer with a paddle attachment at speed 1 for 2 minutes.

The preparation is then placed in a drying oven at 15° C. for 24 hours.

The DM in the fermented preparation amounted to 70.26% and the temperature was 15.2° C.

500 g of preparation is weighed in a bucket made from food-grade PP.

400 g of wheat flour and 100 g of tap water, first cooled to 6° C., are added.

The DM in the fermented preparation amounted to 47.5% and the temperature was 25° C.

The mixture is homogenised using a Kitchenaid 5KSM45 stand mixer with a paddle attachment at speed 1 for 2 minutes.

The preparation is then placed in a drying oven at 15° C. for 24 hours.

The DM in the fermented preparation amounted to 71.14% and the temperature was 15.4° C.

500 g of preparation is weighed in a bucket made from food-grade PP.

400 g of wheat flour and 100 g of tap water, first cooled to 6° C., are added.

The mixture is homogenised using a Kitchenaid 5KSM45 stand mixer with a paddle attachment at speed 1 for 2 minutes.

The preparation is then placed in a drying oven at 15° C. for 96 hours.

The DM in the fermented preparation amounted to 70.9% and the temperature was 14.6° C.

The preparation is placed in a climatic chamber at 4° C. to be chilled and kept at 4° C.

This sourdough will subsequently be used for bread, brioche and panettone applications.

COMPARATIVE EXAMPLE 2

1 kg of wheat grains were weighed in a bucket made from food-grade PP.

5 litres of tap water at 15° C. was added and then left to rest at ambient temperature for 30 minutes.

Washing the wheat grains: the grains, which were submerged in water, were then rubbed between the hands by friction for 10 minutes, after which the water was drained off. 5 litres of tap water at 15° C. is added again, then the grains are once again rubbed between the hands by friction (this operation is repeated five times in succession).

Rinsing the wheat grains: 5 litres of tap water at 25° C. is poured over the wheat grains and the grains are then drained by pressing manually through a conical stainless steel strainer. The water is then discarded and the grains are kept (this operation is repeated 15 times in succession).

Final drainage of the grains by pressing manually through a conical stainless steel strainer. Only the grains are kept.

The kilogram of washed and drained wheat grains are placed in a bucket made from food-grade PP.

4 kg of tap water at 25° C. is added.

The bucket is placed in a drying oven at 25° C. for 67 hours.

The preparation is drained by pressing manually through a conical stainless steel strainer to separate the liquid phase (liquor) from the grains. Only the liquid phase is kept.

1,750 g of liquor is weighed in a bucket made from food-grade PP.

1,750 g of wheat flour is added.

The mixture is homogenised manually using a kitchen whisk for 5 minutes.

The preparation is then placed in a drying oven at 25° C. for 24 hours.

The DM in the fermented preparation amounted to 43.2% and the temperature was 25° C.

3,300 g of preparation is weighed in a bucket made from food-grade PP.

829 g of wheat flour and 825 g of tap water at 25° C. are added.

The mixture is homogenised manually using a kitchen whisk for 5 minutes.

The preparation is then placed in a drying oven at 25° C. for 24 hours.

The DM in the fermented preparation amounted to 43.9% and the temperature was 25° C.

4,800 g of preparation is weighed in a bucket made from food-grade PP.

1,200 g of wheat flour and 1,200 g of tap water at 25° C. are added.

The mixture is homogenised manually using a kitchen whisk for 5 minutes.

The preparation is then placed in a drying oven at 25° C. for 48 hours.

The DM in the fermented preparation amounted to 42.7% and the temperature was 26.2° C.

1,000 g of preparation is weighed in a bucket made from food-grade PP.

311.66 g of wheat flour and 593.33 g of tap water at 25° C. are added.

The mixture is homogenised manually using a kitchen whisk for 5 minutes.

The preparation is then placed in a drying oven at 25° C. for 96 hours.

The DM in the fermented preparation amounted to 33.3%.

1,000 g of preparation is weighed in a bucket made from food-grade PP.

420 g of wheat flour and 580 g of tap water at 25° C. are added.

The mixture is homogenised manually using a kitchen whisk for 5 minutes.

The preparation is then placed in a drying oven at 25° C. for 24 hours.

The DM in the fermented preparation amounted to 34.99% and the temperature was 25° C.

1,000 g of preparation is weighed in a bucket made from food-grade PP.

400 g of wheat flour and 600 g of tap water at 25° C. are added.

The mixture is homogenised manually using a kitchen whisk for 5 minutes.

The preparation is then placed in a drying oven at 25° C. for 24 hours.

The DM in the fermented preparation amounted to 34.53% and the temperature was 24.8° C.

1,000 g of preparation is weighed in a bucket made from food-grade PP.

400 g of wheat flour and 600 g of tap water at 25° C. are added.

The mixture is homogenised manually using a kitchen whisk for 5 minutes.

The preparation is then placed in a drying oven at 25° C. for 96 hours.

The DM in the fermented preparation amounted to 34.30% and the temperature was 25.1° C.

The preparation is placed in a climatic chamber at 4° C. to be chilled and kept at 4° C.

This sourdough will subsequently be used for bread, brioche and panettone applications.

COMPARATIVE EXAMPLE 3

1.5 kg of wheat grains were weighed in a bucket made from food-grade PP.

5 litres of tap water at 15° C. was added and then left to rest at ambient temperature for 30 minutes.

Washing the wheat grains: the grains, which were submerged in water, were then rubbed between the hands by friction for 10 minutes, after which the water was drained off. 5 litres of tap water at 15° C. is added again, then the grains are once again rubbed between the hands by friction (this operation is repeated five times in succession).

Rinsing the wheat grains: 5 litres of tap water at 25° C. is poured over the wheat grains, then the grains are drained by pressing manually through a conical stainless steel strainer. The water is then discarded and the grains are kept (this operation is repeated 15 times in succession).

Final drainage of the grains by pressing manually through a conical stainless steel strainer. Only the grains are kept.

The 1.5 kg of washed and drained wheat grains are placed in a bucket made from food-grade PP.

6 kg of tap water at 25° C. is added.

The bucket is placed in a drying oven at 25° C. for 67 hours.

The preparation is drained by pressing manually through a conical stainless steel strainer to separate the liquid phase (liquor) from the grains. Only the liquid phase is kept.

5,000 g of liquor is weighed in a bucket made from food-grade PP.

5,000 g of wheat flour is added.

The mixture is homogenised manually using a kitchen whisk for 5 minutes.

The preparation is then placed in a drying oven at 25° C. for 24 hours.

The DM in the fermented preparation amounted to 44.8% and the temperature was 26.1° C.

4,500 g of preparation is weighed in a bucket made from food-grade PP.

1,125 g of wheat flour and 1,125 g of tap water at 25° C. are added.

The mixture is homogenised manually using a kitchen whisk for 5 minutes.

The preparation is then placed in a drying oven at 25° C. for 24 hours.

4,000 g of preparation is weighed in a bucket made from food-grade PP.

1,000 g of wheat flour and 1,000 g of tap water at 25° C. are added.

The mixture is homogenised manually using a kitchen whisk for 5 minutes.

The preparation is then placed in a drying oven at 25° C. for 48 hours.

The DM in the fermented preparation amounted to 44.6% and the temperature was 25.6° C.

2,000 g of preparation is weighed in a bucket made from food-grade PP.

600 g of wheat flour and 1,400 g of tap water, first cooled to 6° C., are added.

The mixture is homogenised manually using a kitchen whisk for 5 minutes.

The preparation is then placed in a drying oven at 8° C. for 96 hours.

The DM in the fermented preparation amounted to 35.18% and the temperature was 8.2° C.

2,000 g of preparation is weighed in a bucket made from food-grade PP.

800 g of wheat flour and 1,200 g of tap water, first cooled to 6° C., are added.

The mixture is homogenised manually using a kitchen whisk for 5 minutes.

The preparation is then placed in a drying oven at 8° C. for 24 hours.

The DM in the fermented preparation amounted to 35.1% and the temperature was 7.8° C.

2,000 g of preparation is weighed in a bucket made from food-grade PP.

800 g of wheat flour and 1,200 g of tap water, first cooled to 6° C., are added.

The mixture is homogenised manually using a kitchen whisk for 5 minutes.

The preparation is then placed in a drying oven at 8° C. for 24 hours.

The DM in the fermented preparation amounted to 35.06% and the temperature was 8.2° C.

2,000 g of preparation is weighed in a bucket made from food-grade PP.

800 g of wheat flour and 1,200 g of tap water, first cooled to 6° C., are added.

The mixture is homogenised manually using a kitchen whisk for 5 minutes.

The preparation is then placed in a drying oven at 8° C. for 24 hours.

The DM in the fermented preparation amounted to 35.42% and the temperature was 8° C.

2,000 g of preparation is weighed in a bucket made from food-grade PP.

800 g of wheat flour and 1,200 g of tap water, first cooled to 6° C., are added.

The mixture is homogenised manually using a kitchen whisk for 5 minutes.

The preparation is then placed in a drying oven at 8° C. for 24 hours.

The DM in the fermented preparation amounted to 36.64% and the temperature was 8.2° C.

The preparation is placed in a climatic chamber at 4° C. to be chilled and kept at 4° C.

This sourdough will subsequently be used for bread, brioche and panettone applications.

To obtain the results in Table I, bread, brioche and panettone were produced respectively by the following processes using the VMISPI11 spiral dough mixer.

Speed 1: 70 rpm for the arm; 10 rpm for the bowl.
Speed 2: 160 rpm for the arm; 18 rpm for the bowl.

Manufacturing Process for Ordinary Bread Using Sourdough without the Addition of Baker's Yeast in Example 1 and Comparative Examples 1, 2, 3, 4 and 5

TABLE I

| Order of steps to be observed | Flour type | Traditional French flour |
|---|---|---|
| 1 | Weight of water | The quantity of water added is adjusted according to the consistency of the sourdough (more or less liquid) to obtain dough with an equivalent consistency to ensure optimum fermentation. Example 1: 1,275 g is added to the dough mixer Comparative example 1: 1,425 g Comparative example 2: 1,275 g Comparative example 3: 1,275 g Comparative example 4: 1,200 g Comparative example 5: 1,200 g |
| 2 | Weight of flour | 2,000 g is added to the dough mixer |
| 3 | Weight of sourdough | 200 g is added to the dough mixer |
| 4 | Kneading | Spiral dough mixer 5 min at speed 1, then 3 min at Speed 2 |
| 5 | Weight of salt | 40 g is added to the dough mixer |
| 6 | Kneading | 3 min at Speed 2 |
| 7 | T ° of the dough after kneading | 25-27° C. |
| 8 | First fermentation | 1 hour in the fermentation chamber at 25° C. with a relative humidity of 75% |
| 9 | Division | Manually divided into pieces weighing 350 g and pre-formed into oval balls |
| 10 | Resting | 20 minutes in the fermentation chamber at 25° C. with a relative humidity of 75% |
| 11 | Shaping | Baguette or short baguette (batard) with the seam underneath |
| 12 | Second fermentation | 4 to 5 hours in the fermentation chamber at 25° C. with a relative humidity of 75% |
| 13 | Baking | 20 minutes at 240° C. with steam injected when placed in the oven |

Manufacturing Process for Brioche without the Addition of Baker's Yeast, Using the Sourdough from Example 1 and Comparative Examples 1, 2, 3, 4

TABLE II

| Order of steps to observed | Flour mixture | Traditional French flour + cold Phil bread improver + oatmeal flour |
|---|---|---|
| 1 | Weight of egg | The amount of egg added is adjusted according to the consistency of the sourdough (more or less liquid) to obtain dough with an equivalent consistency to ensure optimum fermentation. Example 1: 900 g is added to the dough mixer Comparative example 1: 1,050g Comparative example 2: 900 g Comparative example 3: 900 g Comparative example 4: 700 g |
| 2 | Weight of sugar | 300 g is added to the dough mixer |
| 3 | Weight of salt | 30 g is added to the dough mixer |
| 4 | Weight of flour | 990 g of traditional French flour + 10 g of cold Phil improver + 500 g of oatmeal flour are added to the dough mixer |
| 5 | Weight of sourdough | 300 g is added to the dough mixer |
| 6 | Kneading | Spiral dough mixer 5 min at speed 1, then 15 min at Speed 2 |
| 7 | Weight of butter | 600 g is added to the dough mixer |
| 8 | Kneading | Spiral dough mixer 5 min at speed 1, then 7 min at Speed 2 |
| 9 | T° of the dough after kneading | 25-28° C. |
| 10 | First fermentation | 1 hour 30 in the fermentation chamber at 25° C. with a relative humidity of 75% |
| 11 | Division | Manually divided into pieces weighing 300 g and pre-formed into oval balls |
| 12 | Resting | 15 minutes in the fermentation chamber at 25° C. with a relative humidity of 75% |

TABLE II-continued

| Order of steps to observed | Flour mixture | Traditional French flour + cold Phil bread improver + oatmeal flour |
|---|---|---|
| 13 | Shaping | In cardboard moulds |
| 14 | Growth with a relative | 16 hours in the fermentation chamber at 22° C. humidity of 75% |
| 15 | Baking | 18 minutes at 160° C. with steam injected when placed in the oven, oven ventilated |

Manufacturing Process for Panettone without the Addition of Baker's Yeast, Using the Sourdough from Example 1 and Comparative Examples 1, 2 and 4

TABLE III

| Order of steps to be observed | Flour type | Panettone mix |
|---|---|---|
| 1 | Weight of water | The quantity of water added is adjusted according to the consistency of the sourdough (more or less liquid) to obtain dough with an equivalent consistency to ensure optimum fermentation. Example 1: 450 g is added to the dough mixer Comparative example 1: 550 g Comparative example 2: 450 g Comparative example 4: 375 g |
| 2 | Weight of flour | 1,000 g of panettone mix |
| 3 | Weight of sourdough | 200 g is added to the dough mixer |
| 4 | Kneading | Spiral dough mixer 5 min at speed 1, then 10 min at Speed 2 |
| 5 | Weight of butter | 300 g is added to the dough mixer |
| 6 | Kneading | Spiral dough mixer 5 min at Speed 1 |
| 7 | Weight of fruit | 460 g is added to the dough mixer |
| 8 | Kneading | Spiral dough mixer 1 min at Speed 1 |
| 9 | T° of the dough after kneading | 24-26° C. |
| 10 | First fermentation | 1 hour 30 in the fermentation chamber at 25° C. with a relative humidity of 75% |
| 11 | Division | Manually divided into pieces weighing 700 g and pre-formed into oval balls |
| 12 | Resting | 20 minutes in the fermentation chamber at 25° C. with a relative humidity of 75% |
| 13 | Shaping | Manual, into balls |
| 14 | Growth | 16 hours in the fermentation chamber at 24° C. with a relative humidity of 75% |
| 15 | Baking | 45 minutes at 150° C. with steam injected when placed in the oven, oven ventilated |

Process for Manufacturing Sourdough Bread Using Sourdough from Comparative Example 6

TABLE IV

| Order of steps to be observed | Flour type | Traditional French flour + T170 rye flour |
|---|---|---|
| 1 | Weight of water | The quantity of water added is adjusted according to the consistency of the sourdough (more or less liquid) to obtain dough with an equivalent consistency to ensure optimum fermentation. 1,180g of water is added to the dough mixer if using sourdough according to the invention 1,100g for commercial sourdough |
| 2 | Weigh tof salt | 36 g is added to the dough mixer |
| 3 | Weight of flour | 1,800 g of traditional French flour + 200 g of T170 rye flour are placed in the dough mixer For sourdough according to the invention: |
| 4 | Weight of sourdough | 20 g is added to the dough mixer For commercial sourdough: 100 g is added to the dough mixer |
| 5 | Kneading | Spiral dough mixer 5 min at speed 1, then 30 seconds at Speed 2 |
| 6 | T° of the dough after kneading | 25-27° C. |
| 7 | First fermentation | 14 hours in the fermentation chamber at 23° C. with a relative humidity of 75% |
| 8 | Division | Manually divided into pieces weighing 1,000 g and 350 g, pre-formed into oval balls |
| 9 | Resting | 20 minutes in the fermentation chamber at 25° C. with a relative humidity of 75% |
| 10 | Shaping | Balls |
| 11 | Second fermentation | 3 hours in the fermentation chamber at 25° C. with a relative humidity of 75% |
| 12 | Baking | 50 minutes at 230° C./240° C. with steam injected when placed in the oven |

COMPARATIVE EXAMPLES 4 AND 5

Bread was prepared using the recipe in Table I with two commercial sourdoughs claiming to produce bread without the need to add yeast. This led to the results shown in Table V.

COMPARATIVE EXAMPLE 6

Sourdough bread was prepared with 1% by weight compared with the weight of flour of a sourdough according to the invention and 5% by weight compared with the weight of flour of a commercial sourdough claiming to produce sourdough bread without the addition of yeast. The results obtained complied with French legislation (Decree No. 93-1074 of 13 Sep. 1993).

TABLE V

| | DM | pH | TTA | Acetic acid | Lactic acid | Yeasts log (CFU)/g | Lactic acid bacteria log (CFU)/g | volume Growth 2 hrs | volume Growth 3 hrs | volume Growth 4 hrs |
|---|---|---|---|---|---|---|---|---|---|---|
| Example 1 | 35.8 | 5.89 | 2 | 87 | 0 | 8.81 | 9.60 | 1.5 | 1.8 | 2.4 |
| Comparative example 1 | 70.9 | 4.03 | 9.5 | 1,032 | 5,640 | 6.89 | 8.59 | 1 | 1 | 1.1 |
| Comparative example 2 | 34.3 | 3.56 | 14 | 734 | 7,662 | 5.90 | 9.08 | 1.1 | 1.2 | 1.4 |
| Comparative example 3 | 36.64 | 4.34 | 5.2 | 305 | 2,942 | 4.85 | 8.56 | 1 | 1 | 1 |
| Comparative example 4 | 16.65 | 4.21 | 22.4 | 6,452 | 17,809 | 7.11 | 8.20 | 1.2 | 1.2 | 1.2 |
| Comparative example 5 | 29.21 | 3.75 | 14.1 | 2327 | 2925 | 5.76 | 7.52 | 1 | 1 | 1 |

| | volume Growth 5 hrs | volume Growth 6 hrs | Results | Bread | Brioche | Panettone |
|---|---|---|---|---|---|---|
| Example 1 | 3 | 3.5 | Successful | 3.93 | 5.09 | 3.87 |
| Comparative example 1 | 1.3 | 1.5 | Failed | 2.67 | 3.55 | 3.09 |
| Comparative example 2 | 1.5 | 1.6 | Failed | 1.89 | 1.06 | 1.76 |
| Comparative example 3 | 1 | 1 | Failed | 1.86 | 1.45 | — |
| Comparative example 4 | 1.2 | — | Failed | 2.14 | 1.96 | 2.18 |
| Comparative example 5 | 1 | — | Failed | 1.94 | — | — |

Parameter units:
DM: %
Acetic acid: ppm
Lactic acid: ppm
Yeasts: log(CFU)/g
Lactic acid bacteria: log(CFU)/g
Specific volume: cm³/g

COMPARATIVE EXAMPLE 7 (AIR BLOWN IN TOO EARLY)

The procedure is as follows:

TABLE VI

| | | |
|---|---|---|
| D0 | Step 1 | 10 kg of organically cultivated wheat grains were weighed in a bucket made from food-grade PP. 30 liters of tap water at 15° C. was added and then left to rest at ambient temperature for 30 minutes. Washing the wheat grains: the grains submerged in water were then rubbed between the hands by friction for 10 minutes, after which the water is drained off. 30 liters of tap water at 15° C. is added again, and the grains are once again rubbed between the hands by friction. This operation is repeated five times in succession. Rinsing the wheat grains: 30 liters of tap water at 25° C. is poured over the wheat grains, then the grains are drained by pressing manually through a conical stainless steel strainer. The water is then discarded while the grains are kept. This operation is repeated 15 times in succession. |
| | Step 2 | Final drainage of the grains by pressing manually through a conical stainless steel strainer. Only the grains are kept. |
| | Step 3 | 10 kg of washed and drained organic wheat grains are placed in a stainless steel Goavec (brand name) fermenter. 40 kg of tap water at 25° C. is added. |
| | Step 4 | The preparation is kept at 25° C. for 72 hours. The preparation undergoes central agitation at 150 rpm and counter-rotation agitation (scraper) at 50 rpm, with continuous aeration by injecting dry compressed oil-free air via a sparger at the bottom of the bowl at a pressure of 6 bar and with a flow rate of 60 Nl/min. (Nl/min: air held under Standart Reference Atmosphere conditions). |
| D3 | Step 5 | The temperature of preparation is 26.4° C. The preparation is taken out of the stainless steel fermenter (liquor + grains). Only the liquid phase (liquor) is kept. |

TABLE VI-continued

| | | |
|---|---|---|
| | Step 6 | 30 kg of liquor is weighed and placed in a Goavec (brand name) stainless steel fermenter.<br>30 kg of T80 whear flour is added.<br>The mixture is homogenised with a rotor-stator agitator at 1,500 rpm for 10 minutes.<br>The preparation is kept 25° C. for 24 hours.<br>The preparation undergoes central agitation at 150 rpm and counter-rotation agitation (scrape) at 50 rpm, with<br>pressure of 6 bar and with a flow of 60 Nl/min. |
| D4 | Step 7 | The DM in fermented preparation smounts to 45.25% and the temperaure is 25.64° C.<br>39.6 kg of the preparation is kept.<br>9.9 kg of T80 wheat flour and 9.9 kg of tap water at 25° C. are added.<br>The mixture is homogenised with a rotor-stator agitator at 1,500 rpm for 10 minutes.<br>The preparation is kept 25° C. for 24 hours.<br>The preparation undergoes central agitation at 150 rpm and counter-rotation agitation (scraper) at 50 rpm, with<br>continuous aeration by injecting dry compressed oil-free air via a sparger at the bottom of the bowl at a<br>pressure of 6 bar and with a flow rate of 60 Nl/min. |
| D5 | Step 8 | The DM in the fermented preparation amounts to 45.02% and the temperature is 26° C.<br>40 kg of the preparation is kept.<br>3.918 kg of T80 wheat flour and 16.1 kg of tap water at 25° C. are added.<br>The mixture is homogenised with a rotor-stator agitator at 1,500 rpm for 10 minutes.<br>The preparation is then kept 25° C. for 48 hours.<br>The preparation undergoes central agitation at 200 rpm and counter-rotation agitation (scraper) at 50 rpm,<br>with continuous aeration by injecting dry compressed oil-free air via a sparger at the bottom of the bowl<br>at a pressure of 6 bar and with a flow rate of 60 Nl/min. |
| D7 | Step 9 | The DM in the fermented preparation amounts to 43.26% and the temperature is 24.81° C.<br>24 kg of the preparation is kept.<br>9.776 kg of T80 wheat flour and 14.2 kg of tap water at 25° C. are added.<br>The mixture is homogenised with a rotor-stator agitator at 1,500 rpm for 15 minutes.<br>The preparation then undergoes fermentation at 25° C. for 72 hours.<br>The preparation undergoes central agitation at 200 rpm and counter-rotation agitation (scraper) at 50 rpm, with<br>continuous aeration by injecting dry compressed oil-free air via a sparger at the bottom of the bowl<br>at a pressure of 6 bar and with a flow rate of 60 Nl/min (Nl/min: air held under Standart Reference Atmosphere<br>conditions). |
| D10 | Step 10 | The DM in the fermented preparation amounts to 33.16% and the temperature is 26.64° C.<br>24 kg of the preparation is kept.<br>10.4 kg of T80 wheat flour and 14.6 kg of tap water at 15° C. are added.<br>The mixture is homogenised with a rotor-stator agitator at 1,500 rpm for 15 minutes.<br>The preparation then undergoes fermentation at 15° C. for 96 hours.<br>The preparation undergoes central agitation at 250 rpm and counter-rotation agitation (scraper) at 15 rpm,<br>with continuous aeration by injecting dry compressed oil-free air via a sparger at the bottom of the bowl<br>at a pressure of 6 bar and with a flow rate of 60 Nl/min. |
| D14 | Step 11 | The DM in the fermented preparation amounts to 45.02% and the temperature is 15.37° C.<br>25 kg of the preparation is kept.<br>10 kg of T80 wheat flour and 15 kg of tap water at 15° C. are added.<br>The mixture is homogenised with a rotor-stator agitator at 1,500 rpm for 15 minutes.<br>The preparation then undergoes fermentation at 15° C. for 24 hours.<br>The preparation undergoes central agitation at 250 rpm and counter-rotation agitation (scraper) at 15 rpm,<br>with continuous aeration by injecting dry compressed oil-free air via a sparger at the bottom of the bowl<br>at a pressure of 6 bar and with a flow rate of 60 Nl/min. |
| | Fermentation stopped | The temperature of the preparation is 16° C.<br>The preparation is cooled to 4° C. and kept at 4° C.<br>This sourdough is tested for bread, brioche, panettone, and sourdough bread applications. |

COMPARATIVE EXAMPLE 8 (IMPROVED SOURDOUGH)

The procedure is as follows:

TABLE VII

| | | |
|---|---|---|
| D0 | Step 1 | 6 kg of organically farmed wheat grains were weighed in a bucket made from food-grade PP.<br>30 liters of tap water at 15° C. was added and then left to rest at ambient temperature for 30 minutes.<br>Washing the wheat grains: the grains submerged in water were then rubbed between the hands by friction for<br>10 minutes, after which the water is drained off. 30 liters of tap water at 15° C. is added again, and the<br>grains are once again rubbed between the hands by friction. This operation is repeated five times in<br>succession.<br>Rinsing the wheat grains: 30 liters of tap water at 25° C. is poured over the wheat grains, then the grains are<br>drained by pressing manually through a conical stainless steel strainer. The water is then discarded while the<br>grains are kept. This operation is repeated 15 times in succession. |
| | Step 2 | Final drainage of the grains by pressing manually through a conical stainless steel strainer. Only the grains are kept. |

TABLE VII-continued

|   |   |   |
|---|---|---|
|    | Step 3 | The 6 kg of washed and drained organic wheat grains are placed in a bucket made from food-grade PP. 24 kg of tap water at 25° C. is added. |
|    | Step 4 | THe bucket is placed in a drying oven at 25° C. for 67 hours. |
| D3 | Step 5 | The preparation is drained by pressing manually through a conical stainless steel strainer to separate the liquid phase (liquor) from the grains. Only the liquid is kept. |
|    | Step 6 | 20 Kg of liquor is weighed and placed in a Goavec (brand name) stainless steel fermenter.<br>20 Kg of T80 wheat flour is added.<br>The mixture is homogenised with a rotor-stator agitator at 1,500 rpm for 10 minutes.<br>The preparation is kept at 25° C. for 24 hours with a low level of central agitation at 80 rpm and counter-rotation agitation (scraper) at 15 rpm. |
| D4 | Step 7 | The DM in the fermented preparation amounts to 43.7% and the temperature is 24.9° C.<br>40 kg of the preparation is kept.<br>10 kg of T80 wheat flour and 10 kg of tap water at 25° C. are added.<br>The mixture is homogenised with a rotor-stator agitator at 1,500 rpm for 10 minutes.<br>The preparation is kept at 25° C. for 24 hours with a low level of central agitation at 80 rpm and counter-rotation agitation (scraper) at 15 rpm. |
| D5 | Step 8 | The DM in the fermented preparation amounts to 43.2% and the temperature is 25.8° C.<br>40 kg of the preparation is kept.<br>10 kg of T80 wheat flour and 10 kg of tap water at 25° C. are added.<br>The mixture is homogenised with a rotor-stator agitator at 1,500 rpm for 10 minutes.<br>The preparation is kept at 25° C. for 48 hours with a low level of central agitation at 80 rpm and counter-rotation agitation (scraper) at 15 rpm. |
| D7 | Step 9 | The DM in the fermented preparation amounts to 42.3% and the temperature is 25.5° C.<br>30 kg of the preparation is kept.<br>15 kg of T80 wheat flour and 15 kg of tap water, first cooled to 6° C., are added.<br>The mixture is homogenised with a rotor-stator agitator at 1,500 rpm for 15 minutes.<br>The preparation is then allowed to ferment for 7 days at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. (Nl/min: air held under Standart Reference Atmosphere conditions). |
| D14 | Step 10 | The DM in the fermented preparation amounts to 41.8% and the temperature is 11.5° C.<br>30 kg of the preparation is kept.<br>14.8 kg of T80 wheat flour and 15.2 kg of tap water, first cooled to 6° C., are added.<br>The mixture is homogenised with a rotor-stator agitator at 1,500 rpm for 15 minutes.<br>The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |
| D16 | Step 11 | The DM in the fermented preparation amounts to 42.1% and the temperature is 12.5° C.<br>30 kg of the preparation is kept.<br>14.8 kg of T80 wheat flour and 15.2 kg of tap water, first cooled to 6° C., are added.<br>The mixture is homogenised with a rotor-stator agitator at 1,500 rpm for 15 minutes.<br>The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |
| D18 | Step 12 | The DM in the fermented preparation amounts to 41.1% and the temperature is 11.6° C.<br>30 kg of the preparation is kept.<br>17.7 kg of T80 wheat flour and 12.3 kg of tap water, first cooled to 6° C., are added.<br>The mixture is homogenised with a rotor-stator agitator at 1,500 rpm for 15 minutes.<br>The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |
| D20 | Step 13 (Step 12 is repeated) | The DM in the fermented preparation amounts to 45.6% and the temperature is 14.5° C.<br>30 kg of the preparation is kept.<br>17.3 kg of T80 wheat flour and 12.7 kg of tap water, first cooled to 6° C., are added.<br>The mixture is homogenised with a rotor-stator agitator at 1,500 rpm for 15 minutes.<br>The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |
| D22 | Step 14 (Step 13 is repeated) | The DM in the fermented preparation amounts to 45.6% and the temperature is 13.4° C.<br>30 kg of the preparation is kept.<br>17.3 kg of T80 wheat flour and 12.7 kg of tap water, first cooled to 6° C., are added.<br>The mixture is homogenised with a rotor-stator agitator at 1,500 rpm for 15 minutes.<br>The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |
| D24 | Step 15 (Step 13 is repeated) | The DM in the fermented preparation amounts to 45.6% and the temperature is 13.6° C.<br>30 kg of the preparation is kept.<br>17.3 kg of T80 wheat flour and 12.7 kg of tap water, first cooled to 6° C., are added.<br>The mixture is homogenised with a rotor-stator agitator at 1,500 rpm for 15 minutes.<br>The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |

TABLE VII-continued

| | | |
|---|---|---|
| D26 | Step 16 (Step 13 is repeated) | The DM in the fermented preparation amounts to 45.6% and the temperature is 13.3° C. 30 kg of the preparation is kept. 17.3 kg of T80 wheat flour and 12.7 kg of tap water, first cooled to 6° C., are added. The mixture is homogenised with a rotor-stator agitator at 1,500 rpm for 15 minutes. The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |
| D28 | Step 17 (Step 13 is repeated) | The DM in the fermented preparation amounts to 47.1% and the temperature is 13° C. 30 kg of the preparation is kept. 17.3 kg of T80 wheat flour and 12.7 kg of tap water, first cooled to 6° C. are addd. The mixture is homogenised with a rotor-stator agitator at 1,500 rpm for 15 minutes. The preparation is then allowed to ferment for 48 hours at 11° C. with central agitation at 250 rpm and counter-rotation agitation (scraper) at 30 rpm, with continuous aeration by injecting dry compressed oil-free air via a sparger at the bottom of the bowl at a pressure of 6 bar and with a flow rate of 100 Nl/min. |
| D30 | Fermentation stopped | The DM in the fermented preparation amounts to 47.1% and the temperature is 13.9° C. The preaparation is cooled to 4° C. and kept at 44° C. This sourdough is tested for bread, brioche, panettone, and sourdough bread applications. |

TABLE VII

Order of steps to be observed

| | Flour type | Traditional Frenchflour + T170 rye flour |
|---|---|---|
| | Basic temperature | 65° C. |
| 1 | Weight water | The quantity of water added is adjusted according to the consistency of the sourdough (more or less liquid) to obtain dough with an equivalent consistency to ensure optimum fermentation. Example D2 isara d + 15: 1,140 g Example Spicher v3: 1,140 g Example according to the invention, improved: 1,140 g |
| 2 | Weight of salt | 36 g is added to the dough mixer |
| 3 | Weight of flour | 1,800 g of traditional French flour + 200 g of T170 rye flour are placed in the dough mixer |
| 4 | Weight of sourdough | 40 g is added to the dough mixer |
| 5 | Kneading | Spiral dough mixer 5 min at speed 1, then 30 seconds at Speed 2 |
| 6 | Temperature of the dough after kneading | 25 to 27° C. |
| 7 | First fermentation | 14 hours in the fermentation chamber at 23° C. with a relative humidity of 75% |
| 8 | Division | Manually divided into pieces weighing 1,000 and 350 g, which are formed into oval balls. |
| 9 | Resting relative | 20 minutes in the fermentation chamber at 25° C. with a humidity of 75% |
| 10 | Shaping | Balls |
| 11 | Second fermentation | 3 hours in the fermentation chamber at 25° C. with a relative humidity of 75% |
| 12 | Baking | 50 min at 230/240° C. with steam injected when placed in the oven for pieces weighing 1 kg and 25 minutes for pieces weighing 350 g. |

The sourdough bread production test is carried out as specified in the operating instructions described in Table VIII using "Spicher" sourdoughs, as in comparative example 7, and in comparative example 8.

The results obtained are summarised in Table IX.

TABLE IX

| | DM | pH | TTA | Acetates | Lactates | Yeast log (CFU)/g | Lactic acid bacteria log (CFU)/g | Growth after 2 hrs | Growth after 3 hrs | Growth after 4 hrs |
|---|---|---|---|---|---|---|---|---|---|---|
| Comparative example 7 | 34.96 | 3.74 | 12.7 | 2,517 | 4,206 | 9.23 | 9.40 | 1.2 | 1.6 | 1.8 |
| Spicher* | 43.16 | 3.93 | 15.3 | 819 | 6,904 | 7.48 | 8.64 | 1.3 | 1.3 | 1.4 |
| Comparative example 8 | 47.24 | 3.92 | 11.1 | 425 | 5,334 | 7.64 | 9.30 | 1.4 | 1.6 | 2 |

| | Measurements only carried out on bread dough | | Specific volumes in cm³/g | | | | Application for sourdough bread | |
|---|---|---|---|---|---|---|---|---|
| | Growth after 5 hrs | Growth after 6 hrs | Bread | Brioche | Panettone | Sourdough bread | Bread pH | Bread acetate (ppm) |
| Comparative example 7 | 2 | 2.2 | 2.81 | 3.86 | 2.83 | 1.85 | 3.91 | 650 |

TABLE IX-continued

| | | | | | | | | |
|---|---|---|---|---|---|---|---|---|
| Spicher* | 1.4 | 1.7 | 2.88 | 2.26 | 2.52 | 2.50 | 4.02 | 148 |
| Comparative example 8 | 2.2 | 3 | 4.30 | 4.79 | 2.69 | 2.48 | 3.92 | 910 |

*Spicher is the sourdough prepared according to Spicher G et al, "*Untersuchungen zur Charakterisierung und Bewertung einer Spontansauers.*" (*Experiments to analyse and assess a spontaneous sourdough.*) *Einfluss der Fuehrungabedingengen auf den Verlauf der spontanen Gaering Geheide Mehl und Brot* Bochum DE vol 4 No. 12 and *Untersuchung zur Charakterisierung und Bewertung verschiedener Verfahren zur Bereitung eines Spontansauers* (Influence of management conditions on the course of spontaneous fermentation. Cereal, flour and bread, Bochum DE, Vol. 4 No. 12 and Experiments to analyse and assess various methods for preparing a spontaneous sourdough) 1st report *Vergieich verschiedener Nr-5497 der Bundes Forschung Anstalt fur Getreide und Kartoffalverarbeitung.* Detmold p 18-122 (Comparison of various No. 5497 by the Federal German Research Institute for Cereals and Potato Processing).
The sourdough in comparative example 7, in which air was blown in from step a) gives an excessively high acetate content and insufficient growth after five hours and six hours, and an inadequate bread volume.
The Spicher sourdough gives inaduquate growth after 5 hours and 6 hours and an inadequate acetate content in the sourdough bread according to the requirements of the legislation.

Measuring the pH, Acetates and Lactates in Bread:

When manufacturing sourdough bread, the endogenous production of organic acids is assessed on the raw bread dough. Cooked sourdough is only analysed on the basis of its crumb. A 25 g sample of crumb or dough is taken, after which precisely 225 ml of water treated by reverse osmosis is added. The mixture is homogenised for five minutes using an ultra-turrax disperser (IKA (brand name) DI 25 basic) at 20,000 rpm.

The pH of this mixture is measured while agitating using a Mettler Toledo ph-meter (brand name), model G20.

The mixture is first centrifuged at 12,000 g for 20 minutes to measure acetic acid and lactic acid. The supernatant is removed for sampling. The analysis is carried out on this sample using an enzymatic method by means of ENZYTEC™ D-/L lactic acid and ENTYTEC™ acetic acid kits (Scil Diagnostic GmbH, Germany). The results are expressed in ppm (parts per million=mg/kg of bread or dough).

TABLE X

Endogenous production of acetic acid when producing sourdough bread.

| | Improved sourdough | Spicher sourdough |
|---|---|---|
| For ph | | |
| After kneading | 6.27 | 6.25 |
| On shaping | 4.00 | 4.12 |
| Before baking | 3.89 | 4.03 |
| Bread crumb | 3.92 | 4.02 |
| Specific volume of the sourdough bread | 2.48 | 2.50 |
| For acetate | | |
| After kneading | 425 | |
| On shaping | 716 | 100 |
| Before baking | 867 | 122 |
| Bread crumb | 910 | 148 |
| For lactate | | |
| After kneading | 808 | 785 |
| On shaping | 5,025 | 4,393 |
| Before baking | 5,452 | 4,760 |
| Bread crumb | 5,655 | 4,786 |

This table shows the monitoring process for the production of endogenous acids during production of sourdough bread.

Endogenous production of the two main acids in sourdough is observed.

In terms of acidity (pH and bread acetate content) only the improved sourdough complies with the statutory criteria.

What is claimed is:

1. A process for producing a sourdough in which the following steps take place consecutively:
   a) washing a fermentable matrix in water by completely submerging it in water and allowing the water to flow until it runs clear so as to obtain a washed matrix to be incubated, which either is still containing 200 g to 1.5 kg of residual water per 2 kg of washed matrix to be incubated, or is containing less than this and, in the latter case, submerging the washed matrix to be incubated in water at between 15° C. and 35° C. at the ratio of 1 kg to 20 kg of water per 2 kg of washed matrix to be incubated,
   a1) incubating said washed matrix to obtain an incubated matrix with a liquid phase, known as a liquor, and a solid phase,
   wherein if the washed matrix to be incubated is submerged in water, then said incubation takes place at between 10 and 35° C. until bubbles appear on the surface of the liquor so as to obtain the incubated matrix,
   b) separating the liquor from the rest of the incubated matrix,
   c) mixing the liquor with a substrate to obtain a mixture with a dry matter content by weight ranging between 15 and 60% and allowing this mixture to ferment for 12 to 72 hours at between 9° C. and 25° C. to obtain a medium and
   d) adding additional substrate and water at between 10° C. and 35° C. to the medium to obtain a product, the addition of additional substrate and water representing 25 to 75% of the total volume, and allowing fermentation for between 12 to 72 hours at between 9° C. and 25° C. while blowing with air, oxygen or a mixture containing oxygen, at a rate ranging from 0.01 m³h/kg of product to 10 m³/h/kg of product, to obtain sourdough.

2. The process according to claim 1, wherein c) and d) are repeated a plurality of times.

3. The process according to claim 1, wherein the fermentable matrix comprises at least one of:
   grains pseudocereals, pulses in all their forms,
   fruits, either whole or in part, both fresh and processed,
   wood from grapevines,
   brassicas, hops, malts and honey.

4. The process according to claim 1, wherein the substrate comprises flour or any other grain or pseudocereal or pulse fraction.

5. The process according to claim 1, wherein step d) is repeated at least three times.

6. The process according to claim 1, wherein step d) is followed by a step e) in which step d) is repeated, but with a dry matter content ranging from 30 to 60%.

7. The process according to claim 6, wherein step e) is repeated at least three times.

8. The process according to claim 6, wherein the substrate has an ash content in excess of 0.75% by weight.

9. A sourdough obtained by the process according to claim 1, with a pH of between 3 and 6, an acetic acid content of less than 2,000 ppm, a lactic acid content of less than 8,000 ppm, a yeast content in log(CFU)/g of between 7 and 9, a lactic acid bacteria content in log(CFU)/g of between 8 and 10, and which, when used in a bakery test in a breadmaking process based on the following consecutive steps: the following are placed in order in a spiral dough mixer with a rotating arm and bowl: 1,275 g of water, 2,000 g of flour and 200 g of sourdough, these are kneaded for 5 minutes with the arm operating at a speed of 70 rpm and the bowl operating at 10 rpm, 40 g salt is added to the mixer, this is then kneaded for three minutes with the arm operating at a speed of 160 rpm and the bowl operating at 18 rpm so as to obtain a dough temperature after the kneading process of 25 to 27° C., the dough undergoes a first fermentation for one hour in a fermentation chamber at 25° C. with a relative humidity of 75%, the dough is manually divided into pieces weighing 350 g, which are pre-formed into oval balls, which are allowed to rest for 20 minutes in a fermentation chamber at 25° C. with a relative humidity of 75%, they are then shaped into a baguette or short baguette (batard) with the seam on top, after which a second fermentation process is carried out for 4 to 5 hours in the fermentation chamber at 25° C. with a relative humidity of 75%, and finally the bread is cooked for 20 minutes at 240° C. with steam injected when placed in the oven, gives a dough prior to baking with a growth measurement in cm in excess of 2 after five hours, a growth measurement in excess of 2.8 after six hours, and this cooked dough gives a bread with a specific volume at least equal to 3 $cm^3/g$.

10. The sourdough according to claim 9, wherein the acetate content of the bread is in excess of 900 ppm and its pH is less than 4.3.

11. The process according to claim 2, wherein steps c) and d) are repeated three times.

12. The process according to claim 3, wherein:
said grains comprise at least one of soft wheat, hard wheat and rye,
said pseudocereals comprise at least one of buckwheat and quinoa,
said pulses comprises at least one of whole dry or sprouted seeds, flours, cornmeal, bran and germ,
said fruits either whole or in part comprise at least one of: apples, pears, bananas, skin, flesh, pulp, pips, juices and fermented musts,
said wood from grapevines comprises at least one of stalks and chips,
said malts comprise at least one of wheat malt and barley malt.

* * * * *